(12) United States Patent
Kalidas et al.

(10) Patent No.: US 12,483,543 B2
(45) Date of Patent: Nov. 25, 2025

(54) SECURE DIGITAL CERTIFICATE GENERATION AND STORAGE FOR AUTHENTICATION

(71) Applicant: Truist Bank, Charlotte, NC (US)

(72) Inventors: Arjun Kalidas, Charlotte, NC (US); Chandramouli Kirupakaran, Charlotte, NC (US); Ashok Kumar Mittal, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 253 days.

(21) Appl. No.: 18/342,059

(22) Filed: Jun. 27, 2023

(65) Prior Publication Data

US 2025/0007902 A1 Jan. 2, 2025

(51) Int. Cl.
*H04L 9/40* (2022.01)

(52) U.S. Cl.
CPC .............................. *H04L 63/0823* (2013.01)

(58) Field of Classification Search
CPC .................................................. H04L 63/0823
See application file for complete search history.

(56) References Cited

U.S. PATENT DOCUMENTS

| | | | | |
|---|---|---|---|---|
| 8,468,583 B2 * | 6/2013 | Andrews | ............... | H04L 9/3268 713/156 |
| 8,589,691 B1 * | 11/2013 | Hackborn | ............. | H04L 9/3263 713/176 |
| 9,189,285 B2 * | 11/2015 | Ng | .................... | H04N 21/6125 |
| 9,544,188 B2 * | 1/2017 | Mordani | ................ | H04L 63/08 |
| 9,847,905 B2 * | 12/2017 | Perez | ...................... | H04L 67/10 |
| 11,153,297 B2 * | 10/2021 | Aronov | ............... | H04L 63/0823 |
| 11,153,363 B1 * | 10/2021 | Speller, III | .......... | H04L 63/0807 |
| 11,563,590 B1 * | 1/2023 | Bowen | .................. | H04L 9/3247 |
| 11,563,598 B2 * | 1/2023 | Lange | ............... | H04L 12/40078 |
| 11,706,207 B1 * | 7/2023 | Fynaardt | ............... | H04L 9/0822 |
| 11,812,265 B1 * | 11/2023 | Gupta | ................ | H04W 12/0471 |
| 11,888,997 B1 * | 1/2024 | Bowen | ................ | H04L 9/3247 |
| 12,210,726 B1 * | 1/2025 | Loo | ........................ | H04L 67/34 |
| 2005/0071630 A1 * | 3/2005 | Thornton | .............. | H04L 9/3226 713/156 |
| 2011/0029771 A1 * | 2/2011 | Mehta | ................... | H04L 9/3265 713/156 |
| 2016/0218882 A1 * | 7/2016 | Wood | .................... | H04L 9/3268 |
| 2018/0145837 A1 * | 5/2018 | Kass | ..................... | H04L 63/101 |
| 2018/0227292 A1 * | 8/2018 | Golshan | ............. | H04L 63/0823 |

(Continued)

*Primary Examiner* — Matthew Smithers

(74) *Attorney, Agent, or Firm* — Michael A. Springs, Esq.; Shumaker, Loop & Kendrick, LLP; Patrick B. Horne

(57) ABSTRACT

Systems and methods obtain a prepackaged file including third-party digital certificates stored to a cloud object storage location and communicatively connect a channel, configured to read data from the prepackaged file, to the cloud object storage location to facilitate generating a plurality of digital certificates. Further, the plurality of digital certificates are generated and each generated certificate of the plurality of generated certificates corresponds to a respective third-party certificate of the third-party digital certificates stored to the cloud object storage location and one or more authentication processes to access the prepackaged file and to facilitate storing the plurality of generated digital certificates is performed via the channel. The plurality of generated digital certificates are stored to at least one file location to facilitate future authentication.

20 Claims, 4 Drawing Sheets

(56) References Cited

U.S. PATENT DOCUMENTS

| | | | |
|---|---|---|---|
| 2019/0165950 A1* | 5/2019 | Ibrahim | H04L 9/3268 |
| 2019/0372783 A1* | 12/2019 | Martinez | H04L 9/3268 |
| 2021/0258306 A1* | 8/2021 | Dowd | H04L 63/104 |
| 2022/0239503 A1* | 7/2022 | Mallikarjuna Durga Lokanath | H04L 9/0891 |
| 2022/0263655 A1* | 8/2022 | Murray | H04L 63/0823 |
| 2022/0284101 A1* | 9/2022 | Simon | H04L 9/3247 |
| 2023/0385400 A1* | 11/2023 | Gauthier | G06Q 20/38215 |

\* cited by examiner

400

ADD RESPECTIVE CERTIFICATES OF THE PLURALITY OF DIGITAL CERTIFICATES TO A PREPACKAGED FILE WITH THIRD-PARTY DIGITAL CERTIFICATES, THEREBY CREATING TRUSTED CERTIFICATES
405

STORE THE TRUSTED CERTIFICATES TO AT LEAST ONE FILE LOCATION THAT INCLUDES THIRD-PARTY DIGITAL CERTIFICATES TO FACILITATE FUTURE AUTHENTICATION, WHERE THE AT LEAST ONE FILE LOCATION INCLUDES A KEY FILE
410

STORE A COPY OF THE KEY FILE THAT INCLUDES THE TRUSTED CERTIFICATES TO A WRITABLE LOCATION PROVIDED BY A SERVERLESS COMPUTING PLATFORM
415

USE THE KEY FILE TO WRITE THE TRUSTED CERTIFICATES FROM THE AT LEAST ONE LOCATION TO THE WRITABLE LOCATION
420

PROVE AUTHENTICITY OF A REQUEST USING ONE OR MORE OF THE TRUSTED CERTIFICATES
425

FIG. 4

SECURE DIGITAL CERTIFICATE GENERATION AND STORAGE FOR AUTHENTICATION

FIELD OF THE INVENTION

This invention relates generally to the field of digital certificates, and more particularly embodiments of the invention relate to digital certificate generation and storage.

BACKGROUND OF THE INVENTION

A digital certificate includes a copy of a public key from a certificate holder that encrypts the message or data that needs to be matched to a corresponding private key in order to decrypt the message or data. In general, digital certificates are used to ensure that data, such as messages, documents, files, etc. are sent by an intended sender, and are used to verify the integrity and authenticity of the sender. Digital certificates are often created and issued by a certificate authority entity or other trusted organization and are used in cryptography to provide secure communication protocols. Secure communication protocols can include, for example, secure sockets layer (SSL) and transport layer security (TLS) protocols, which are commonly used in web browsing, email, and/or various other processes to ensure that a message or data is not read or accessed by unintended recipients, is unaltered, and is received from a trusted sender. However, certifications regularly update or change, which can require a new manual build and deploy process to account for the certification changes. This manual build and deploy process needed for authentication and verification can consume time and resources in order to account for these changes, which can be cumbersome, especially for large-scale enterprises and organizations, and can result in compatibility issues, latencies, etc.

Thus, a need exists for improved systems and methods for digital certificate generation and storage.

BRIEF SUMMARY

Shortcomings of the prior art are overcome and additional advantages are provided through the provision of a computing system for digital certificate generation and storage. The system includes at least one processor, a communication interface communicatively coupled to the at least one processor, and a memory device storing executable code. When the executable code is executed, it causes the at least one processor to, at least in part, obtain a prepackaged file comprising third-party digital certificates stored to a cloud object storage location and communicatively connect a channel, configured to read data from the prepackaged file, to the cloud object storage location to facilitate generating a plurality of digital certificates. The at least one processor is further caused to generate the plurality of digital certificates, where each generated certificate of the plurality of digital certificates corresponds to a respective third-party certificate of the third-party digital certificates stored to the cloud object storage location, and perform, via the channel, one or more authentication processes to access the prepackaged file and facilitate storing the plurality of generated digital certificates. In addition, the at least one processor is further caused to store the trusted certificates to at least one file location to facilitate future authentication.

Additionally, disclosed herein is a computing system for digital certificate generation and storage. The system includes at least one processor, a communication interface communicatively coupled to the at least one processor, and a memory device storing executable code that, when executed, causes the at least one processor to, at least in part, store trusted certificates to at least one file location that includes third-party digital certificates, the trusted certificates being stored to facilitate future authentication, the at least one file location comprising a key file. The at least one processor is further caused to store a copy of the key file that includes the trusted certificates to a writable location provided by a serverless computing platform, and prove authenticity of a request using one or more of the trusted certificates.

Also disclosed herein is a computer-implemented method for digital certificate generation and storage. The computer-implemented method includes, at least in part, obtaining a prepackaged file comprising third-party digital certificates stored to a cloud object storage location, and communicatively connecting a channel, configured to read data from the prepackaged file, to the cloud object storage location to facilitate generating a plurality of digital certificates. The method further includes generating the plurality of digital certificates, wherein each generated certificate of the plurality of digital certificates corresponds to a respective third-party certificate of the third-party digital certificates stored to the cloud object storage location, performing, via the channel, one or more authentication processes to access the prepackaged file and facilitate storing the plurality of generated certificates, and storing the plurality of generated digital certificates to at least one file location to facilitate future authentication.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

FIG. 4 depicts a block diagram of an example method for digital certificate generation and storage, in accordance with an embodiment of the present invention.

DETAILED DESCRIPTION

Figure 1:
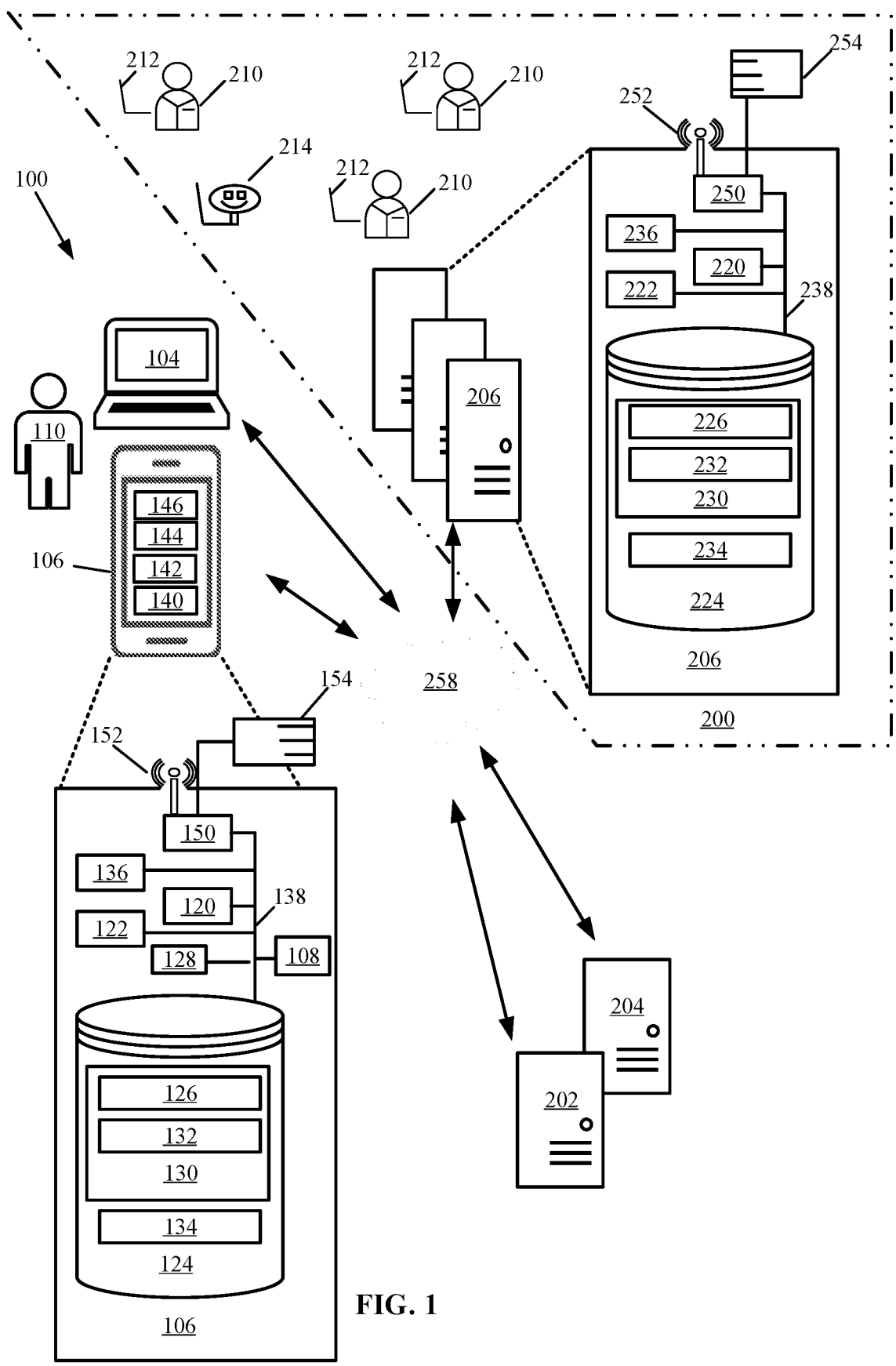
FIG. 1 illustrates an example computing environment that facilitates digital certificate generation and storage, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms.

Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

Like numbers refer to like elements throughout. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "couple," "coupled," "couples," "coupling," "fixed," "attached to", and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about", "approximately", or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise that hosts, maintains, or uses computer systems that provide functionality for the disclosed systems and methods. In particular, the term "enterprise" may generally describe a person or business enterprise providing goods or services. Interactions between an enterprise system and a user device can be implemented as an interaction between a computing system of the enterprise, and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with another external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein, with reference to flowchart illustrations and/or block diagrams of computer-implemented methods and computing systems according to embodiments of the invention. Each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus or apparatuses (the term "apparatus" includes systems and computer program products). In particular, the computer readable program instructions, which be executed via the processor of the computer or other programmable data processing apparatus, create a means for implementing the functions/acts specified in the flowchart and/or block diagram block or blocks.

In one embodiment, these computer readable program instructions may also be stored in one or more computer-readable storage media that can direct a computer or other programmable data processing apparatus, and/or other devices, to function in a particular manger, such that a computer readable storage medium of the one or more computer-readable storage media having instructions stored therein comprises an article of manufacture including instructions which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block or blocks.

In another embodiment, these computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions, whether stored in the computer-readable storage medium and/or computer-readable memory may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable instructions for implementing the specified logical function(s). Additionally, the alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, or the functions of the blocks may sometimes be executed in the reverse order, depending upon the functionality involved.

FIG. 1 illustrates a computing environment 100 that facilitates digital certificate generation and storage, according to at least one embodiment of the present invention. The computing environment 100 generally includes a user 110 (e.g., an employee of an enterprise) that benefits through use of services and products offered by the enterprise system 200. The computing environment 100 may include, for example, a distributed cloud computing environment (private cloud, public cloud, community cloud, and/or hybrid cloud), an on-premise environment, fog-computing environment, and/or an edge-computing environment. The user 110 accesses services and products of the enterprise system 200 by use of one or more user devices, illustrated in separate examples as 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system used on personal computers, central computing systems, phones, and other devices.

The user 110 can be any individual, a group, entity, etc. that is in possession of or has access to the user device 104, 106, which may be personal or public items. Although the user 110 may be singly represented in some figures, in at least in some embodiments the user 110 is one of many such that a group of users through multiple user devices utilize the computing environment 100 to communicate with the enterprise system 200.

The user device 104, 106, but as illustrated with reference to the mobile device 106, includes components such as, at least one of each of a processor 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user, or required or related to any or all of the applications or programs 130.

The memory device 122 is operatively coupled to the processor 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory additionally or alternatively can include an electrically erasable programmable read-only memory (EEPROM), flash memory or the like.

According to various embodiments, the memory device 122 and storage device 124 may be combined into a single storage medium. The memory device 122 and storage device 124 can store any of a number of applications that comprise computer-executable instructions and code executed by the processing device 120 to implement the functions of the user device 104, 106 described herein. For example, the memory device 122 may include such applications as a conventional web browser application and/or an enterprise-distributed application (e.g., a mobile application), collectively referred to herein as a "web portal". These applications also typically provide a graphical user interface (GUI) on the display 140 that allows the user 110 to communicate via the user device 104, 106 with, for example, an enterprise system 200, and/or other devices or systems. For instance, the GUI on the display 140 may include features for displaying information and accepting inputs from users, and may include fillable text boxes, data fields, hyperlinks, pull down menus, check boxes, and the like.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

According to one embodiment, the input and output system 136 may include an optical instrument (e.g., camera 146) configured to capture an image. For instance, the optical instrument may include one or more lenses and one or more image sensors (e.g., a charge coupled device (CCD) sensor) configured to convert photons into an electrical signal. For example, pixels of each the image sensors may each include a photodiode (e.g., a semiconductor) that becomes electrically charged in accordance with the strength of the light that strikes the photodiode, where the electrical charge is then relayed to be converted to an electrical signal. In one embodiment, a series of pulses may be applied to the one or more image sensors to relay the accumulate charges within each photodiode in succession down a row of photodiodes to an edge of the respective image sensor. Other optical instrument functionalities are also contemplated herein.

In one embodiment, the input and output system 136 may also be configured to obtain and process various forms of authentication to obtain authentication information of a user 110 in order to provide, for example, access to a specific web portal of the enterprise system 200. For instance, the web portal may be accessed based on the user providing authentication information to log in to the web portal in order to perform various functionalities described herein. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a Global Positioning System (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS may be included for navigation and location-related data exchanges, ingoing and/or outgoing. Communications may also or alternatively be conducted via the connector 154 for wired connections such as by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

Computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more human agents 210, and as an input device by providing virtual buttons, selectable options, a virtual keyboard, and other indicia that, when touched or activated, control or prompt the agent device 212 by action of the human agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

The computing system 206 may have various components similar to the user device 104, 106. For instance, in one example the computing system 206 may include at least one of each of a processing device 220, and a memory device 222 for use by the processing device 220, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data and files, such as those for user accounts, user profiles, enterprise data, files downloaded or received from other devices, and other data items preferred by the user and/or enterprise or required or related to any or all of the applications or programs 230.

As illustrated, the computing system 206 includes an input/output system 236, which generally refers to, includes, and/or is operatively coupled with agent devices 212 and automated system(s) 214, as well as various other input and output devices. According to various embodiments, the computing system 206 may be used to distribute the digital data collection program as, for example a Software-as-a-Service (SaaS) that can be accessed by the user device 104, 106 on a subscription basis via a web browser or mobile application. SaaS may provide a user 110 with the capability to use applications running on a cloud infrastructure of the enterprise system 200, where the applications are accessible using the user device 104, 106 via a thin client interface such as a web browser and the user 110 is not permitted to manage or control the underlying cloud infrastructure (i.e., network, servers, operating systems, storage, or specific application capabilities that are not user-specific) of the enterprise system 200.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device 104, 106.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also, or alternatively, be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing system 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices 104, 106, the agent devices 212, computing system 206, which may be one or any number centrally located or distributed, are in communication through one or more networks, referenced as network 258 in FIG. 1.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of this description. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMAX, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, frames using frame relay, voice, video, data, and other suitable information between network addresses. The network 258 may also include one or more local area networks (LANs), radio access networks (RANs), metropolitan area networks (MANs), wide area networks (WANs), personal area networks (PANs), WLANs, campus area network (CAN), storage-area network (SAN), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public). In one particular embodiment, the network 258 includes Amazon Web Services (AWS) cloud computing platform.

Two external systems 202 and 204 are expressly illustrated in FIG. 1, representing any number and variety of data sources, users, consumers, customers, third-party PaaS, third-party IaaS, external databases, business entities, banking systems, enterprises, organizations, institutions, companies, government entities, clubs, and groups of any size are all within the scope of the description. According to various embodiments, external systems 202 and 204 may utilize software applications that function using external resources that are available through a third-party provider such as SaaS, PaaS, or IaaS service models. Such external systems 202, 204 include the third party systems accessible via the agent devices 212 using a software application (e.g., an integrated mobile software application or an application programming interface (API) software application) that can be integrated with the computing system 206 to facilitate communication between software and systems and also configured to utilize different data formats between systems. In another embodiment, the third party system may be accessible by the agent devices 212 using a web-based software interface (e.g., a website).

In certain embodiments, one or more of the systems described herein such as the user device (referring to either or both of the computing device 104 and the mobile device 106), the enterprise system 200, and/or the external systems 202 and 204 are, include, or utilize virtual resources. Such virtual resources are or include cloud resources or virtual machines. The virtual resources may utilize a cloud-computing configuration to provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud-computing configuration so that the resources may be shared as needed.

For secure communication protocols that include SSL or TLS it is common to use a keystore and a truststore. A keystore and a truststore are password-protected files that sit on the same file system of whatever application is running. The format used for the keystore and truststore depends on the programming language. For Java, which is an object oriented programming language and computing platform, a Java KeyStore (JKS) file repository of security certificates (e.g., authorization certificates or public key certificates) and corresponding private keys for Java applications. For Java applications, a keystore, such as JKS or PKCS #12, includes a single complete certificate (public and private key) that is used to identify the server, and a truststore includes the public keys of certificates of third parties that should be trusted by the server by default. In one example methodology, when an SSL connection is established between a client and server, the server looks up the private key from the keystore and presents its corresponding public key and a certificate with a common name that matches the server's host name, and that is signed by a certificate in the truststore used by the client. A JKS file is a keystore that holds the identity key for the server for client authentication, and the SSL truststore serves as a repository for certificates to authenticate the server.

In general, APIs are software-to-software interfaces that allow different applications to communicate and exchange information or functionality, which advantageously allows businesses to exchange and access data, code, software, or services and extend functionality of various products. An API call is the process in which a client application submits a request for data to an API, the API retrieves the requested data from an external server or program and delivers the requested data to the client. An API call includes the uniform resource identifier (URI) of the server or external program in which the requested data is stored as well as a hypertext transfer protocol (HTTP) method (e.g. POST, GET, PUT, PATCH, DELETE, HEAD, OPTIONS, CONNECT, TRACE). In one embodiment, when a backend API call is initiated by a client, an HTTP request is sent from a client (e.g. browser) to the server, and the server returns a response to the client that includes status information about the request and/or the requested content. During this process, the certificate of the backend call is typically verified using certificates stored by the truststore.

In an on-premise server, the certificates stored to the truststore can be updated for certain enterprise needs so that those certificates can be used to authenticate various communications and/or data exchanges for certain enterprise applications. In a cloud-based environment, Docker is a PaaS that delivers software in packages called containers and can be used to automate deployment of applications for different environments. Containers may include an abstraction of an application layer that packages code and dependencies together, and Docker packages an application and its dependencies in a virtual container that can be operated with various operating systems. In some instances, a single virtual machine can run several containers per host. Container images become containers at runtime, and for Docker containers the images can become containers when they run on the Docker Engine. For various enterprise functionalities, a build process can be performed such that the certificates used to authenticate various communications and data exchanges are built into the container image itself.

However, an issue arises in a serverless computing platform such as Amazon Web Services (AWS) Lambda, there is not a container or server that the enterprise can maintain and use to build certificates into the container or store to the server. Thus, a need exists for digital certificate generation and storage in a serverless environment in which the enterprise does not manage or maintain a container or server. Current technology requires a build time in order to package the certificate and build an image or rebuild an image if the certificate renews. The invention disclosed herein eliminates the build time process to package the certificate and redeploy it.

Figure 2:
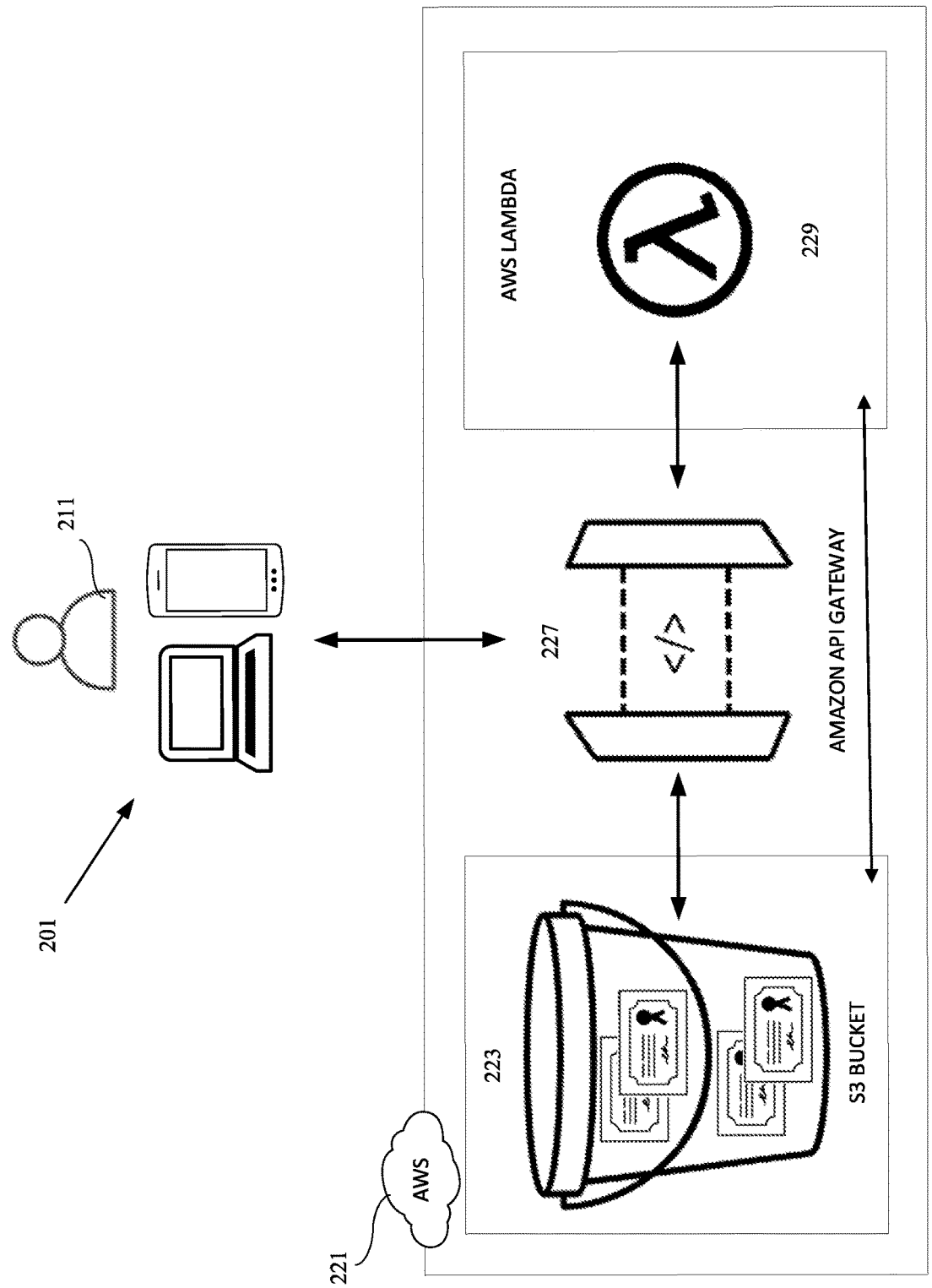
FIG. 2 depicts an example methodology for digital certificate generation and storage, in accordance with an embodiment of the present invention.

FIG. 2 depicts an example methodology for digital certificate generation and storage, according to one embodiment. Specifically, a certificate can be uploaded into an Amazon Simple Storage Service (S3) bucket 223 on the AWS cloud 221 so that the certificate can automatically be picked up by the application at runtime. In particular, the code may be written to pull from the S3 bucket 223, which stores static files and uploaded data, and dynamically load the certificates into the truststore of the JVM installation since the enterprise does not control the JVM in AWS Lambda 229. In some embodiments, the developer 211 creates a Lambda function that performs logic for the API, which can be written in a number of programming languages and can access data from the S3 bucket 223. Further, the developer 211 can create an Amazon API Gateway 227 that uses the lambda function as the backend and expose the Lambda function to handle requests from a variety of clients. When a client device 201 sends a request to the Amazon API Gateway 227, the request is then forwarded on to the Lambda function in order to perform any necessary processing, such as accessing the certificates from the S3 bucket 223, and then the Amazon API Gateway 227 returns the response to the client device 201. The response can be, according to various embodiments, in various formats including JavaScript Object Notation (JSON) or extensible markup language (XML) and can include data from the Lambda function.

In some embodiments, client-side rendering (CSR) renders pages using JavaScript and all logic, data fetching, routing, etc. are handled on the client device 201 so that a developer 211 can create each route directly in the browser. The certificate can be added to the S3 bucket 223 using CSR to the truststore either at startup or the truststore can periodically check the S3 location to add updated certificates to the truststore at runtime. The Amazon API Gateway 227 enables API developers 211 to create APIs that access AWS cloud 221 for use in client applications and acts as the primary interface for applications to access data, business logic, and functionality from backend services such as code running on AWS Lambda 229. In some embodiments, an AWS software development kit (SDK) may be used by developers 211 to create code that runs on the AWS cloud 221 and incorporates various platform building tools such as debuggers, compilers, and libraries to support the platform integration. In particular, the SDK may enable developers to program the AWS Lambda 229 to pull the certificates of the S3 bucket 223 and load the certificates in the truststore in order to authenticate the API call. For instance, S3 APIs provided by AWS SDK for Java may read each .cer file that is fetched from the S3 bucket 223.

In order to ensure that the S3 bucket 223 has the certificates needed, a certificate authority (CA) certificate generator gathers third party certificates that are signed by trusted certificate authorities (e.g., Verisign, GeoTrust, Go Daddy, etc.) that are already prepackaged with a JVM environment and adds additional private certificates that are required to authenticate communication between various enterprise applications and third party integrations. In some embodiments, the prepackaged certificates include more than one hundred standard CA-signed certificates that are used to authorize applications and communicate with various websites. In particular, the prepackaged certificates file is gathered from the JVM and an inputStream is opened to read the prepackaged certificates file. The .cer files, which are in the form of a data stream readable by the inputStream. The S3 bucket 223 is then accessed where additional certificates required for the enterprise are stored and a new certificate is generated for each .cer file that is present in the S3 bucket 223. In some embodiments, the .cer files are used to generate a certificate of type X.509 using the X509Certificate API provided by Java.

The newly created certificates are added to the existing JVM file and a new JKS truststore, which is password protected, is created. The new JKS truststore is also stored in a writable location (e.g. a /tmp/ writable folder) for use by the AWS Lambda 229 that the AWS Lambda 229 provides for every instance of a lambda function. This dedicated temporary space may be, according to one embodiment, approximately 512 megabytes (MB), and is used to store files that the lambda can use during its life. The writable location may be cleaned or wiped upon every new run when a new instance of the lambda function is created. For AWS Lambda 229, the /tmp/ writable location is the only writable folder, but in other applications, if a project has write access to a resource bundle then the resource bundle may be more conducive for long-term use. The lambda function may invoke various other services that contact, according to one embodiment, an event-based routing engine such as that provided by The Information Bus Company (TIBCO) that requires the certificate to prove authenticity of a request that is made. In some embodiments, such as XML-based network calls (e.g., simple object access protocol (SOAP) network calls) would also require use of the certificate to prove authenticity.

A manual build and deploy process used to add certificates to a truststore, package the certificates to a container image, repackage and redeploy the image when the certificate is updated, etc. is bypassed because the certificates can be accessed from the writable location in real time. There is no longer a need to repackage and redeploy the certificate for each application because the certificate only needs to be updated and uploaded into the S3 bucket 223 so that whatever application is being run can automatically load the certificate to the truststore and the writable location, which mirrors the truststore due to being updated at startup or periodically during runtime. At startup when the application is loaded, the backend call can be made to the truststore to authenticate the certificate, which would be updated with whatever certificates are uploaded into the S3 bucket 223. The AWS cloud 221 may recycle the writable location, but when a new application is started, and a new temporary folder is created that mirrors the truststore, the updated certificate will be available.

Figure 3:
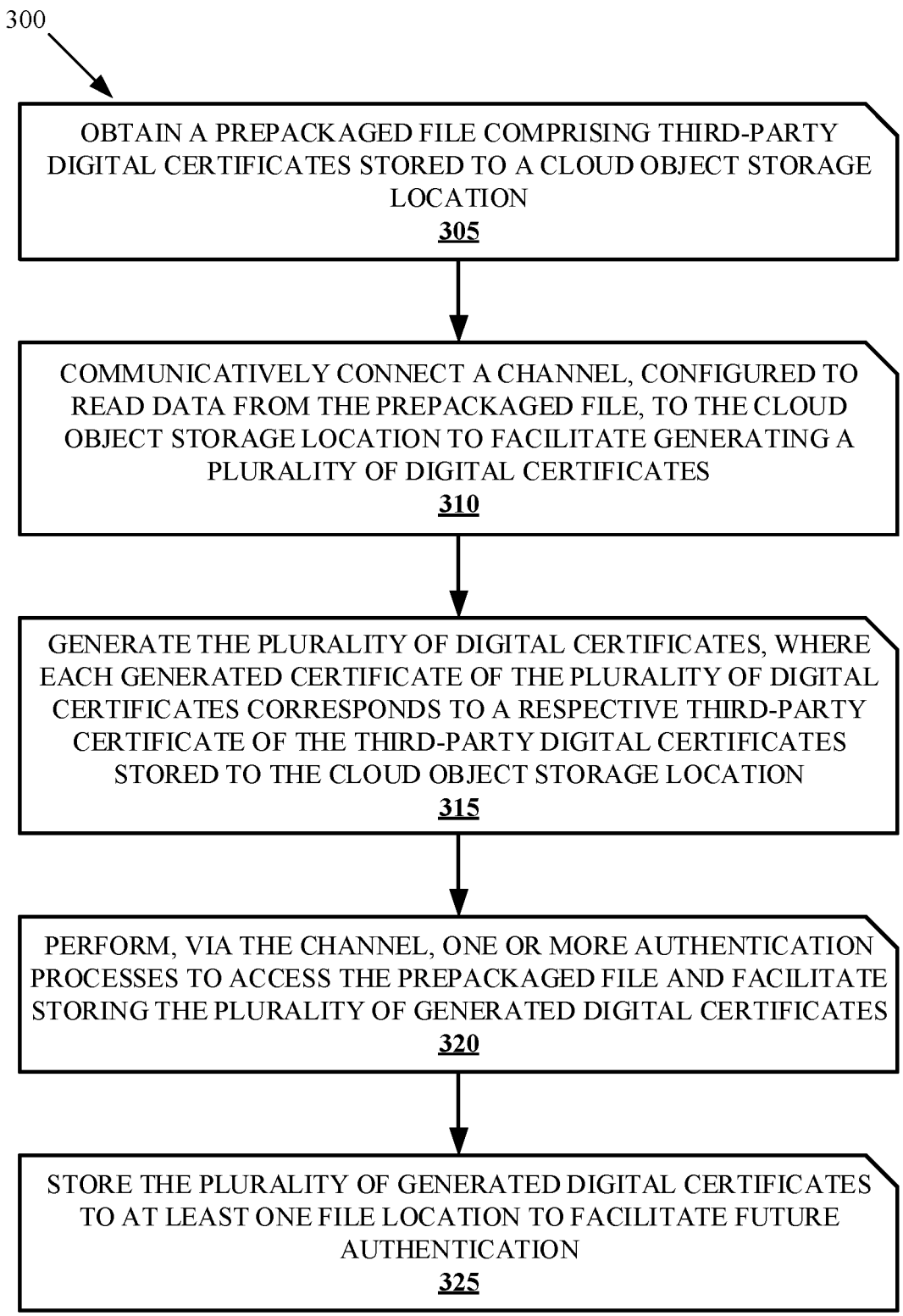
FIG. 3 depicts a block diagram of an example method for digital certificate generation and storage, in accordance with an embodiment of the present invention.

FIG. 3 depicts a block diagram of an example method 300 for digital certificate generation and storage, in accordance with an embodiment of the present invention. In this example, if a backend service is undergoing a certificate update or there is a new certificate, the new certificate can be loaded in advance to the truststore so that functionality is not impacted when the backend API domains change. At block 305, a prepackaged file that includes third-party digital certificates stored to a cloud object storage location (e.g., a bucket/container) is obtained. According to one embodiment, the prepackaged file is accessed from a virtual machine that stores the prepackaged file, and the third-party digital certificates are issued by a third-party certificate authority to authorize an application to communicate with one or more websites. Further, the cloud object storage location may include a hard disk, a cloud drive, or the like.

At block 310, the computing system communicatively connects a channel, which is configured to read data from the prepackaged file, to the cloud object storage location (e.g., bucket/container) to facilitate generating a plurality of digital certificates. According to one embodiment, the method 300 further includes opening the channel to perform a reading of the data from the file, where the channel is read via an InputStream. In some embodiments, the channel includes an Amazon S3 API. Further, according to various embodiments, the cloud object storage location includes an Amazon S3 bucket.

At block 315, the plurality of digital certificates are generated, where each generated certificate of the plurality of digital certificates corresponds to a respective third-party certificate of the third-party digital certificates (e.g., for each .cer file present in the cloud object storage location) stored to the cloud object storage location. At block 320 one or more authentication processes to access the prepackaged file and facilitate storing the plurality of generated digital certificates are performed via the channel. The generated digital certificates may be added to the prepackaged file, where the generated digital certificates may be required for various enterprise related applications in order to access certain third-party services. Further, at block 325, the plurality of generated digital certificates are stored to at least one file location to facilitate future authentication. According to one embodiment, the at least one file location includes the cloud object storage location (e.g., container/bucket). In some embodiments, the method 300 further includes creating a key file, storing the key file to a writable location provided by a serverless computing platform, using the key file to write the trusted certificates from the at least one location to the writable location, and proving authenticity of a request using one or more of the trusted certificates. In some embodiments, the serverless computing platform includes AWS Lambda and the writable location includes a temporary folder that exists during life of a lambda function of the AWS Lambda. In some instances, the temporary folder is wiped upon a new instance of another lambda function of the AWS Lambda. Further, the key file may include a JKS, and the at least one file location includes a resource bundle file.

FIG. 4 depicts a block diagram of an example method 400 for digital certificate generation and storage, in accordance with an embodiment of the present invention. According to various embodiments, the CA certificate file is obtained from the Java Virtual Machine of the container in which a particular microservice is running. At block 405, respective certificates of a plurality of digital certificates are added to a prepackaged file with third-party digital certificates, thereby creating trusted certificates. At block 410, the trusted certificates are stored to at least one file location (e.g., an Amazon S3 bucket) that includes third-party digital certificates, the trusted certificates being stored to facilitate future authentication, and the at least one file location includes a key file (e.g., a JKS). In some embodiments, the key file includes a JKS and the at least one file location includes an Amazon S3 bucket. In some embodiments, a prepackaged file is opened and new certificates that go by the file extension .cer are added to the prepackaged file. At block 415, a copy of the key file that includes the trusted certificates is stored to a writable location provided by a serverless computing platform. In some embodiments, the serverless computing platform includes AWS Lambda, and the writable location includes a temporary folder that exists during life of a lambda function of the AWS Lambda. According to various embodiments, a copy of a file that includes the new certificates is stored in a /tmp/ folder of the AWS Lambda. At block 420, the key file is used to write the trusted certificates from the at least one location to the writable location, and at block 425 authenticity of a request is proven using one or more of the trusted certificates.

Advantageously, the disclosed systems and methods modify conventional protocols to update certificates and improves the functioning of a computer and the technical field of cryptography by bypassing the build and deploy process so that updated certificates can be available in real time, which can reduce latencies and improve efficiencies. This technical solution to a technical problem. Additionally, this functionality is particularly relevant when enterprises are working in a serverless environment, since otherwise each application would need to be manually packaged with and coupled to each application.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®", "Windows®", "macOS®", "iOS®", "Android®", and the like may be subject to trademark rights in various jurisdictions throughout the world and are used here only in reference to the products or services properly denominated by the marks to the extent that such trademark rights may exist.

What is claimed is:

1. A computing system for digital certificate generation and storage, the system comprising:
   at least one processor;
   a communication interface communicatively coupled to the at least one processor; and
   a memory device storing executable code that, when executed, causes the at least one processor to:

obtain a prepackaged file comprising third-party digital certificates stored to a cloud object storage location;

communicatively connect a channel, configured to read data from the prepackaged file, to the cloud object storage location to facilitate generating a plurality of digital certificates;

generate the plurality of digital certificates, wherein each generated certificate of the plurality of digital certificates corresponds to a respective third-party certificate of the third-party digital certificates stored to the cloud object storage location;

perform, via the channel, one or more authentication processes to access the prepackaged file and facilitate storing the plurality of generated digital certificates; and store the plurality of generated digital certificates to at least one file location to facilitate future authentication, wherein the at least one file location comprises the cloud object storage location.

2. The computing system of claim 1, wherein the prepackaged file is accessed from a virtual machine that stores the prepackaged file, wherein the third-party digital certificates are issued by a third-party certificate authority to authorize an application to communicate with one or more websites.

3. The computing system of claim 1, wherein the at least one processor is further caused to open the channel to perform the reading of the data from the file, and wherein the reading is performed via an InputStream.

4. The computing system of claim 1, wherein the channel comprises an Amazon Simple Storage Service (Amazon S3) application programming interface.

5. The computing system of claim 1, wherein the cloud object storage location comprises an Amazon S3 bucket.

6. The computing system of claim 1, wherein the at least one processor is further caused to:
create a key file;
store the key file to a writable location provided by a serverless computing platform;
use the key file to write the trusted certificates from the at least one location to the writable location; and
prove authenticity of a request using one or more of the trusted certificates.

7. The computing system of claim 6, wherein the serverless computing platform comprises Amazon Web Services (AWS) Lambda.

8. The computing system of claim 7, wherein the writable location comprises a temporary folder that exists during life of a lambda function of the AWS Lambda.

9. The computing system of claim 8, wherein the at least one processor is further caused to wipe the temporary folder upon a new instance of another lambda function of the AWS Lambda.

10. The computing system of claim 6, wherein the key file comprises a Java Keystore (JKS).

11. The computing system of claim 1, wherein the at least one file location further comprises a resource bundle file.

12. The computing system of claim 1, wherein the future authentication is for an API call.

13. A computing system for digital certificate generation and storage, the system comprising:
at least one processor;
a communication interface communicatively coupled to the at least one processor; and
a memory device storing executable code that, when executed, causes the at least one processor to:
store trusted certificates to at least one file location that includes third-party digital certificates, the at least one file location comprising an Amazon S3 bucket, the trusted certificates being stored to facilitate future authentication, the at least one file location comprising a key file;
store a copy of the key file that includes the trusted certificates to a writable location provided by a serverless computing platform; and
prove authenticity of a request using one or more of the trusted certificates.

14. The computing system of claim 13, wherein the key file comprises a Java Keystore (JKS).

15. The computing system of claim 13, wherein the serverless computing platform comprises Amazon Web Services (AWS) Lambda.

16. The computing system of claim 15, wherein the writable location comprises a temporary folder that exists during life of a lambda function of the AWS Lambda.

17. The computing system of claim 15, wherein the writable location includes a temporary folder that exists during life of a lambda function of the AWS Lambda.

18. A computer-implemented method for digital certificate generation and storage, the method comprising:
obtaining a prepackaged file comprising third-party digital certificates stored to a cloud object storage location, wherein the cloud object storage location comprises an Amazon S3 bucket;
communicatively connecting a channel, configured to read data from the prepackaged file, to the cloud object storage location to facilitate generating a plurality of digital certificates;
generating the plurality of digital certificates, wherein each generated certificate of the plurality of digital certificates corresponds to a respective third-party certificate of the third-party digital certificates stored to the cloud object storage location;
performing, via the channel, one or more authentication processes to access the prepackaged file and facilitate storing the plurality of generated certificates; and
storing the plurality of generated digital certificates to at least one file location to facilitate future authentication.

19. The computer-implemented method of claim 18, wherein the channel comprises an Amazon Simple Storage Service (Amazon S3) application programming interface.

20. The computer-implemented method of claim 18, wherein the future authentication is for an API call.

* * * * *